United States Patent [19]
Shen et al.

[11] Patent Number: 5,742,459
[45] Date of Patent: Apr. 21, 1998

[54] MAGNETIC HEAD HAVING ENCAPSULATED MAGNETORESISTIVE TRANSDUCER AND MULTILAYERED LEAD STRUCTURE

[75] Inventors: Yong Shen, Milpitas; Chyu Jiuh Torng, Pleasanton; Daniel A. Nepela, San Jose, all of Calif.

[73] Assignee: Read-Rite Corporation, Milpitas, Calif.

[21] Appl. No.: 666,209

[22] Filed: Jun. 20, 1996

[51] Int. Cl.$^6$ ................................................. G11B 5/127
[52] U.S. Cl. ............................................................ 360/113
[58] Field of Search ........................... 360/113; 324/252; 338/32 R

[56] References Cited

U.S. PATENT DOCUMENTS

| | | | |
|---|---|---|---|
| 5,018,037 | 5/1991 | Krounbi et al. | 360/113 |
| 5,434,826 | 7/1995 | Ravipati et al. | 360/113 |
| 5,491,600 | 2/1996 | Chen et al. | 360/113 |
| 5,532,892 | 7/1996 | Nix et al. | 360/113 |

Primary Examiner—Stuart G. Levy
Assistant Examiner—David D. Davis
Attorney, Agent, or Firm—Nathan N. Kallman

[57] ABSTRACT

A magnetic head assembly includes a read head having an active central region and two inactive side regions contiguously formed relative to the central region. The central region includes a magnetoresistive (MR) transducer for enabling active sensing of data recorded on a magnetic medium. Protective layers encapsulate the central region and separate it from the side regions, such that diffusion and electromigration are reduced. Each end region includes a longitudinal bias layer, and a multilayered conductive section. The longitudinal bias layer may be formed of alternating layers of antiferromagnetic material and layers of soft magnetic material and/or hard magnetic longitudinal bias. The multilayered conductive section includes conductive leads that do not contact either the MR element or the soft bias layer. The conductive layers are interlayered between a plurality of spacers that provide structural support to the conductive section, and that increase the overall mechanical hardness of the conductive section. Some or all of the protective layers as well as the spacers of the conductive sections may be made from selected refractory materials.

16 Claims, 2 Drawing Sheets

MAGNETIC HEAD HAVING ENCAPSULATED MAGNETORESISTIVE TRANSDUCER AND MULTILAYERED LEAD STRUCTURE

FIELD OF THE INVENTION

This invention relates to magnetic heads and in particular to a magnetoreristive (MR) head having an encapsulated transducer for reducing diffusion and electromigration.

DESCRIPTION OF THE PRIOR ART

Typically, magnetic heads include inductive elements for recording data onto a disk, and magnetoresistive (MR) transducers for reading the recorded data from the disk. The operation of the MR transducer is based on the principle that the resistance of certain materials changes when subjected to a magnetic field. Output signals from the MR transducer are generated by supplying it with a constant direct electrical current. The flux from a recorded magnetic disk that is seen by the sensing MR transducer is reflected by a change in voltage that is proportional to the change in resistance of the material caused by the flux from the medium.

One objective when using a flying head on which the MR transducer is disposed in a transducing relationship with the magnetic disk is to increase the current density through the MR transducer in order to optimize the output signal. However, a problem with increasing the current density is failure caused by electromigration. The electromigration phenomenon occurs when a unidirectional current flows through the MR transducer and directionally biases the atom motion, resulting in layer thinning, increased operating temperature, and eventual irrevocable damage to the MR head.

U.S. Pat. No. 5,491,600 to Chen et al. proposes the use of a trilayer structure including an MR layer that overlays a nonmagnetic spacer layer made of tantalum (Ta) for preventing exchange coupling between the MR layer and a soft magnetic bias layer. In addition, a capping layer of tantalum overlays the MR layer. However, the junctions between the passive end regions comprising the lead structures and the MR layer are not protected against diffusion, as the underlayer/hard bias/leads or hard/bias leads are in direct contact with the MR layer.

SUMMARY OF THE INVENTION

An object of this invention is to provide a magnetic head having an encapsulated MR structure for reducing current shunting, diffusion and electromigration effects.

Another object of the invention is to provide materials useful to encapsulate the MR transducer and to form a multilayered lead structure within the magnetic head.

According to this invention, a magnetic head includes a read transducer having an active central region and two inactive side regions contiguously formed relative to the central region. The central region includes a magnetoresistive (MR) element for enabling active sensing of data on a magnetic medium. Protective layers encapsulate the central region and separate it from the side regions, such that diffusion and electromigration are reduced.

Each end region includes a hard bias layer and a multilayered conductive section. A longitudinal bias layer may be formed of alternating layers of antiferromagnetic material and layers of soft magnetic material. Alternatively a permanent magnet material of high coercivity could be used in a single or multiple layer with Cr or CrV or other suitable material upon which the hard magnet is deposited. This configuration produces the equivalent of a hard magnetic bias. The multilayered conductive section includes conductive leads that do not contact either the MR element or soft bias layer of the MR trilayer structure. The conductive leads are interlayered between a plurality of spacers that provide structural support to the conductive section and that increase the overall mechanical hardness of the conductive lead section.

According to the present invention, some or all of the protective encapsulating layers as well as the spacers of the conductive sections may be made from a refractory material selected from: Group 1 comprising the elements of tantalum (Ta) and niobium (Nb); Group 2 comprising alloys and higher order of alloys comprising tantalum tungsten, niobium tungsten, niobium tantalum, molybdenum niobium, molybdenum tungsten, molybdenum tantalum, chromium molybdenum, chromium tungsten, and tantalum rhenium; and Group 3 comprising the compounds and complex carbides and nitrides comprising tantalum nitride, niobium nitride, tungsten nitride, zirconium nitride, zirconium carbide, tantalum carbide and niobium carbide.

The magnetic head disclosed herein achieves higher sensing current density, tighter MR resistance control and signal amplitude distribution, superior manufacturing process, better wafer-to-wafer reproducibility, and an improved microtrack profile relative to conventional magnetic heads. The magnetic head of this invention improves the control of magnetostriction across the entire MR element by minimizing diffusion into the junction regions of the MR element and the transverse soft bias film. In addition, the MR head can sustain a higher operating current and a correspondingly larger signal for a predetermined electromigration device life.

BRIEF DESCRIPTION OF THE DRAWING

The invention will be described in greater detail with reference to the drawing in which.

Similar numerals refer to similar elements in the drawing. It should be understood that the sizes of the different components in the figures are not necessarily to scale or in exact proportions, and are shown for visual clarity and for the purpose of explanation.

DETAILED DESCRIPTION OF THE INVENTION

Figure 1:
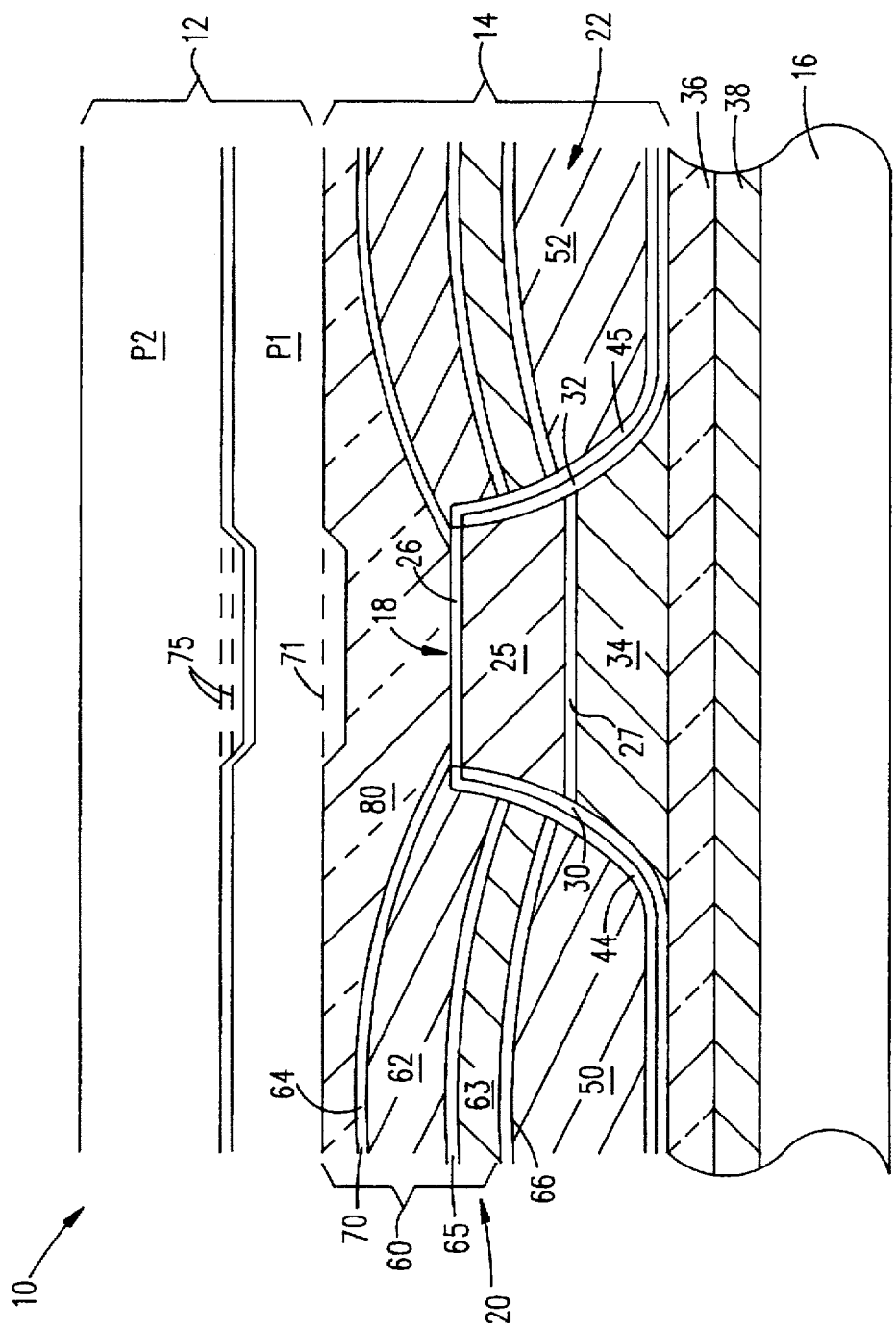
FIG. 1 is a sectional view of a magnetic head including an MR head made according to the present invention.

FIG. 1 illustrates a magnetic head 10 according to a first embodiment of the present invention. The magnetic head 10 is formed of a write head 12 and an MR read head 14 that are disposed on a substrate 16. The MR read head 14 includes an active central region 18 and two inactive side regions 20, 22. The central region 18 is biased with a transverse bias 34. The two side regions 20, 22 include longitudinally bias layers 50 and 52 and lead structure 60.

The central region 18 of the MR head 14 enables active sensing of data on the magnetic medium by utilizing an MR element 25. The MR element 25 may be formed of nickel iron (NiFe) and is encapsulated with protective layers 26, 27, 30 and 32. The top surface of the MR element 25 is overcoated with a capping layer 26, and the bottom surface of the MR element is underlaid with a spacing layer 27. The junctions between the MR element 25 and the side regions 20, 22 may also be covered with protective layers such as spacer layers 30, 32. The purpose of the capping layer 26, the spacing layer 27 and the junction spacer layers 30, 32 is to protect the central region 18 by preventing it from directly contacting any material other than its encapsulating layers, in order to minimize diffusion and electromigration. As a result, the MR read head 14 retains its magnetic stability during the life of the magnetic head 10 in a superior way.

The transverse bias in the central region 18 is produced by a transverse soft bias layer 34 that overlays part of an insulator 36 on which the MR head 14 is formed. The insulator 36 is composed of any suitable material, such as a mechanically hard insulator such as alumina ($Al_2O_3$) or diamond-like carbon. A soft magnetic shield layer 38 underlays the insulator 36 and is formed on top of the substrate 16. The soft magnetic shield layer 38 is composed of any suitable magnetic material with soft magnetic properties such as a nickel-iron alloy like Permalloy or FeAlSi alloys, and shields the MR head 14 from magnetic flux to produce a high resolution magnetic head 10.

The capping layer 26 and the spacing layer 27 and junction layers 30 and 32 may be selected from any suitable refractory material or combination of materials selected from (a) the group comprising the elements of tantalum or niobium; or (b) the group of alloys and higher order of alloys comprising tantalum tungsten, niobium tungsten, niobium tantalum, molybdenum niobium, molybdenum tungsten, molybdenum tantalum, chromium molybdenum, chromium tungsten, and tantalum rhenium; or (c) the group of compounds and complex carbides and nitrides comprising tantalum nitride, niobium nitride, tungsten nitride, zirconium nitride, zirconium carbide, tantalum carbide and niobium carbide.

The foregoing elements, alloys and compounds provide the MR head 14 with greater resistance to electromigration effects and allow operation at higher currents. The thickness of the layers 26, 30 and 32 may range between about 20 to 50 Angstroms. The thickness of the spacing layer 27 may range between about 50 to 250 Angstroms.

As higher recording densities are progressively required and MR heads become thinner, the encapsulation concept of the present invention will become progressively more effective in the stabilization of MR heads. However, thin MR elements present several design and manufacturing challenges. As the thickness of the MR element is reduced, its surface layer presents increased impact on magnetic properties such as magnetostriction. Therefore, the preparation and composition of the surface layer become particularly important. In addition, as the MR element is patterned, the preparation process might introduce surface contamination and corrosion. As a result, the protection of the surface layer is a significant factor, and will play an increasingly important role relative to the manufacture yield.

The capping layer 26 and the spacer layers 30, 32 overcoat the junctions between the central region 18, including the MR element 25, the spacing layer 27, and the transverse soft bias layer 34, and the side regions 20, 22, in order to physically separate the central region 18 from the side regions 20, 22. The spacer layers 30, 32 may be composed of any of the refractory materials listed in the foregoing groups 1, 2 and 3 or a combination thereof. They further improve the magnetic stability of the MR head 14 and reduce diffusion from the side regions 20, 22 to the MR central region 18, thereby minimizing electromigration and improving the device performance. The thickness of the spacer layers 30, 32 ranges between about 20 to 50 Angstroms. The spacer layers 30, 32 are formed by means of well known techniques, such as sputtering, evaporation, and ion beam deposition.

Optionally, two overcoat layers 44, 45 overlay the spacer layers 30, 32, respectively. In one embodiment, the overcoat layers 44, 45 are made of chromium in order to enhance the magnetic property of the hard bias layers 50, 52 that form part of the inactive side regions 20, 22. It should however be understood that any suitable spacer material may be used to form the overcoat layers 44, 45, including the refractory materials listed in groups 1, 2 and 3 above. In alternative designs the overcoat layers 44, 45 may be omitted entirely.

According to another aspect of the present invention, the inactive end regions 20, 22 are generally similar, and therefore only one inactive end region 20 will be described in detail. The end region 20 is formed of the hard bias layer 50 and a multi-layered conductive section 60. The hard bias layer 50 may be formed of any suitable material, including alternating layers of antiferromagnetic material and soft ferromagnetics such as Pd/PtMn/NiFe, PdMn/NiFe, IrMn/NiFe, FeMn/NiFe, or NiMn/NiFe, or alternatively of hard magnetic material such as CoPtCr, CoPt, CoCrTa, or CoNiCr. The longitudinal bias layer 50 is separated from the central region 18 by means of the spacer layers 30 and 44. The layer 44 optionally may be absent.

The multilayered conductive section 60 includes conductive leads 62, 63 that do not contact either the MR element 25 or the soft bias layer 34 directly, but rather contact the encapsulation layers such as layers 26, 30 and 32. The conductive layers 62, 63 provide the current carrying elements of the conductive section 60, and are made of highly conductive metals or metal alloys such as Au. The thickness of each conductive layer may range between about 100 to 400 Angstroms. While only two conductive leads 62, 63 are shown for illustration purpose, it should be noted that additional layers may be added.

The conductive lead layers 62, 63 are interlayered between spacers 64, 65, 66 that provide structural support to the relatively soft conductive leads 62, 63, and that increase the overall hardness of the conductive section 60. This structural support provides the mechanical strength and stability needed to overcome the problem of mechanical smearing. In addition, the added structural support may reduce the overall thickness of the conductive section 60, and causes the upper surface 70 of the MR read head 14 to be almost planar, as illustrated by the dashed line 71. As a result of the planarization of the upper surface 70, the gap 73 formed between the leading pole P1 and the trailing pole P2 of the write head 12 is also substantially planar, as illustrated by the dashed lines 75. Consequently, the writing performance of the magnetic head 10 is significantly improved. In an alternative embodiment, the upper surface 70 is not planar, but the leading pole P1 and thus the gap 73 are substantially planar.

The spacers 64–66 may be composed of any of the refractory materials listed in groups 1, 2 or 3 above or a combination thereof. The thickness of each spacer may be in the range of approximately 20 to 100 Angstroms. While only three spacers 64–66 are shown for illustration purpose, it should be noted that additional spacers may be used.

An insulator layer 80 is formed on top of the capping layer 26 and the upper spacer 64, or over lead 62 if the spacer 64 were not used, in order to provide an insulating separation between the write head 12 and the read head 14. The write head 12 is then formed using known deposition techniques.

Figure 2:
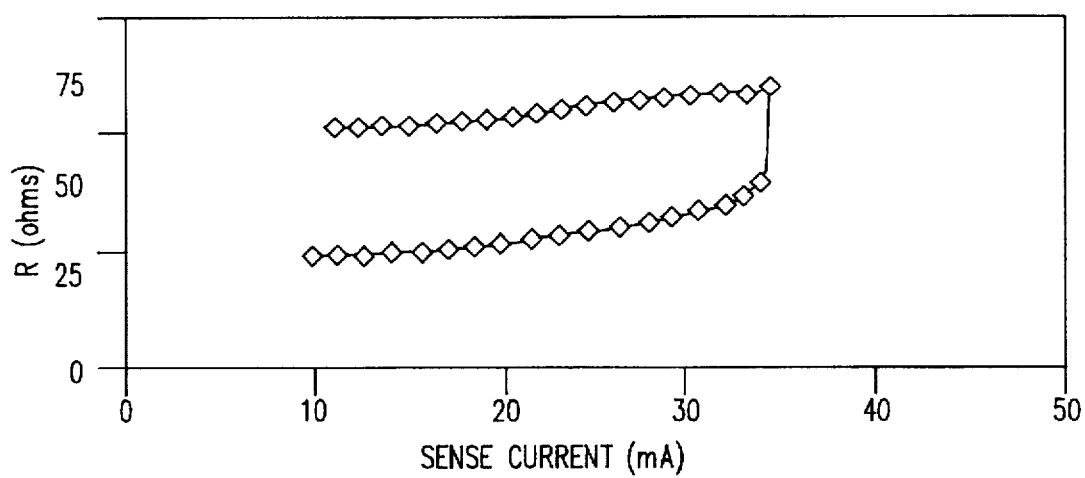
FIG. 2 is a graph plotting resistance versus sense current in a prior art MR head with a tantalum spacing layer.
Figure 3:
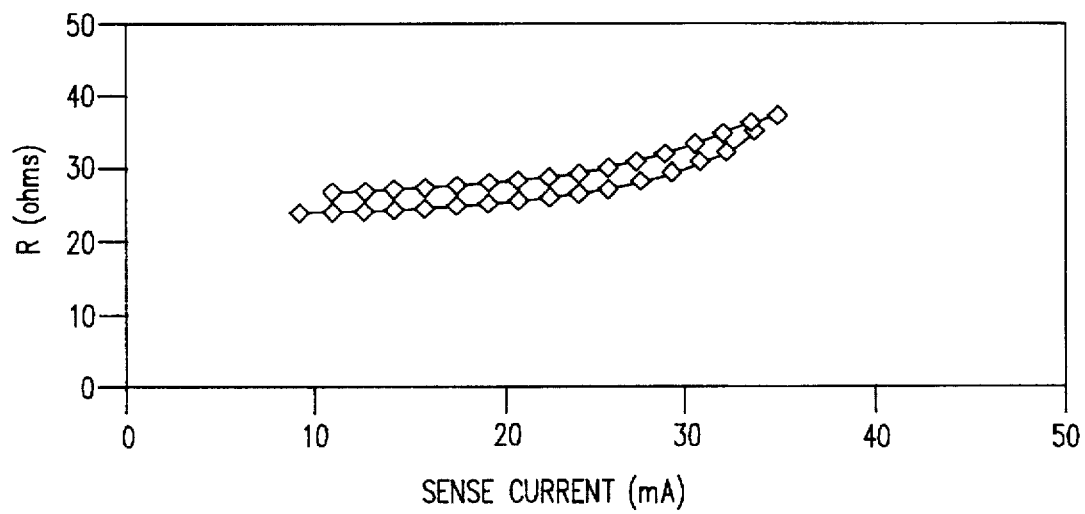
FIG. 3 is a graph plotting resistance versus sense current in a prior art MR head with tantalum spacing and capping layers.
Figure 4:
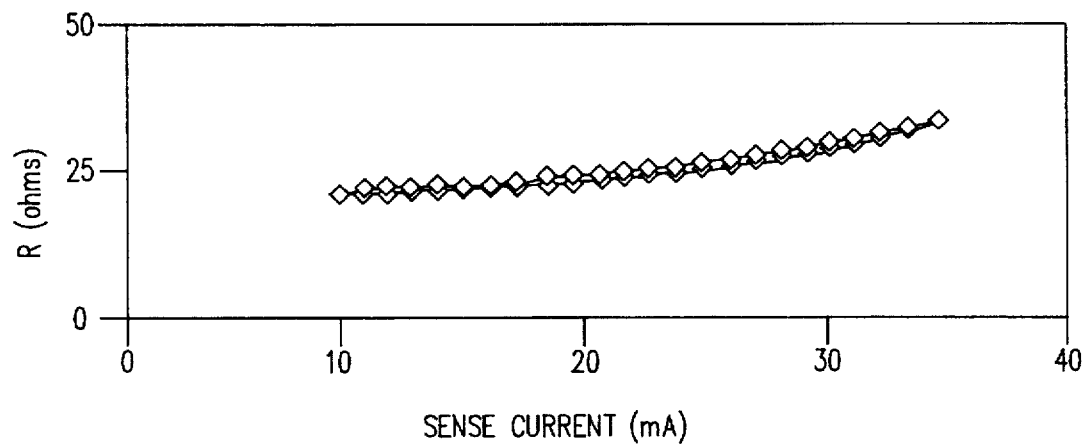
FIG. 4 is a graph plotting resistance versus sense current in the MR head of this invention illustrated in FIG. 1.

With reference to FIGS. 2 through 4, test results were obtained using three wafers with magnetic heads having the same composition and dimensions (track width of 2.5 microns and stripe height of 2 microns). Each of the magnetic heads included a trilayer structure having a first layer consisting of a 225 Angstrom thick NiFe MR element 25, a second layer consisting of a 125 Angstrom thick Ta spacer 27, and a third layer consisting of a 175 Angstrom thick transverse soft bias layer 34.

FIG. 2 is a graph plotting the resistance in ohms versus the sense current in milliamperes, in a conventional MR head (first wafer) having only a tantalum spacer layer 26. The experiment included increasing and then decreasing the sense current by 1 milliampere at periodic intervals of 10 seconds, up to 36 milliamperes and then back to 10 milliamperes (ma). The hysteresis graph in FIG. 2 demonstrates that the MR head 14 underwent a significant and highly undesirable permanent change.

FIG. 3 is a graph plotting resistance versus sense current in a conventional MR head (second wafer) having only a tantalum capping layer 26 and a tantalum spacing layer 27. The MR head underwent similar experimental conditions as with the first wafer. The hysteresis graph in FIG. 3 demonstrates that the MR head 14 still underwent an undesirable permanent change that is less pronounced than that of the first wafer.

FIG. 4 is a graph plotting resistance versus sense current in the MR head 14 (third wafer) according to the present invention, and having a tantalum capping layer 26, a tantalum spacing layer 27, and two tantalum spacer layers 30, 32. The MR head underwent similar experimental conditions as with the first and second wafers. The hysteresis graph in FIG. 4 demonstrates that the MR head 14 underwent a minimal permanent change.

The following Table I lists the measured breakdown currents for the three experimental wafers described above, and shows that the third wafer, that is the wafer constructed according to the present invention has a significantly improved breakdown current over the other two wafers. Breakdown current is defined by the device reaching an infinite resistance or becoming electrically open.

TABLE I

| BREAKDOWN CURRENTS | |
|---|---|
| | Breakdown Current |
| First Wafer | 37 mA |
| Second Wafer | 42 mA |
| Third Wafer | 48 mA |

While specific embodiments of the MR head assembly have been illustrated and described in accordance with the present invention, other modifications will become apparent to those skilled in the art, without departing from the scope of the invention. For instance, similar encapsulating structures and/or lead structures can be used in spin valve and giant magnetoresistance (GMR) heads.

What is claimed is:

1. A magnetic head assembly including a magnetoresistive read head disposed on a substrate comprising:

two magnetoresistively inactive side regions;

a magnetoresistivitely active central region disposed between said side regions;

a magnetoresistive element disposed within said active central region for sensing data recorded on a magnetic medium; and protective layers for encapsulating said magnetoresistive element and for separating said central region from said side regions, said protective layers being formed of electrically conductive material;

wherein in each of said side regions a longitudinal bias layer is formed of alternating layers of antiferromagnetic material and layers of soft magnetic material;

so that diffusion and electromigration experienced by the magnetic head assembly in operation are effectively reduced.

2. A magnetic head assembly according to claim 1, wherein said protective layers are formed of refractory materials.

3. A magnetic head assembly according to claim 1, wherein said central region and said side regions define junctions therebetween; and wherein said conductive protective layers include:

a capping layer that overcoats an upper surface of said magnetoresistive element;

a spacing layer that underlays a bottom surface of said magnetoresistive element; and a plurality of junction spacer layers for isolating said junctions.

4. A magnetic head assembly according to claim 3, wherein at least one of said protective layers is made from a refractory material or combination of materials selected from (a) the group comprising the elements of tantalum or niobium; or (b) the group of alloys and higher order of alloys comprising tantalum tungsten, niobium tungsten, niobium tantalum, molybdenum niobium, molybdenum tungsten, molybdenum tantalum, chromium molybdenum, chromium tungsten, and tantalum rhenium; or (c) the group of compounds and complex carbides and nitrides comprising tantalum nitride, niobium nitride, tungsten nitride, zirconium nitride, zirconium carbide, tantalum carbide and niobium carbide.

5. A magnetic head assembly according to claim 3, wherein said central region includes a soft bias layer that underlays said spacing layer.

6. A magnetic head assembly according to claim 5, wherein said soft bias layer is coated in part with said junction spacer layers.

7. A magnetic head assembly according to claim 4, including overcoat layers that overlay said junction spacer layers.

8. A magnetic head assembly according to claim 7, wherein said overcoat layers are made of chromium or chromium alloys.

9. A magnetic head assembly according to claim 7, wherein said side regions are formed of a longitudinal bias layer and a multilayered conductive section.

10. A magnetic head assembly according to claim 9, wherein said multilayered conductive section includes one or more conductive leads that do not contact either said magnetoresistive element or said soft bias layer directly.

11. A magnetic head assembly according to claim 10, wherein said conductive layers are interlayered between a plurality of spacers for providing structural support to said conductive section, and for increasing the overall mechanical hardness of said conductive section.

12. A magnetic head assembly according to claim 11, wherein said plurality of spacers are made from a refractory material or combination of materials selected from (a) the group comprising the elements of tantalum or niobium; or (b) the group of alloys and higher order of alloys comprising tantalum tungsten, niobium tungsten, niobium tantalum, molybdenum niobium, molybdenum tungsten, molybdenum tantalum, chromium molybdenum, chromium tungsten, and tantalum rhenium; or (c) the group of compounds and complex carbides and nitrides comprising tantalum nitride, niobium nitride, tungsten nitride, zirconium nitride, zirconium carbide, tantalum carbide and niobium carbide.

13. A magnetic head assembly according to claim 4, including an inductive write head.

14. A magnetic head assembly according to claim 4, wherein said magnetoresistive element is biased with a transverse bias, and said two side regions are provided with a longitudinal bias to said magnetoresistive element.

15. A magnetic head assembly according to claim 3, wherein said capping layer and said spacing layer are made from a refractory material or combination of materials selected from (a) the element of niobium; or (b) the group of alloys and higher order of alloys comprising tantalum tungsten, niobium tungsten, niobium tantalum, molybdenum niobium, molybdenum tungsten, molybdenum tantalum, chromium molybdenum, chromium tungsten, and tantalum rhenium; or (c) the group of compounds and complex carbides and nitrides comprising tantalum nitride, niobium nitride, tungsten nitride, zirconium nitride, zirconium carbide, tantalum carbide and niobium carbide.

16. A magnetic head assembly according to claim 3, wherein said junction spacer layers are made from a refractory material or combination of materials selected from (a) the group comprising the elements of tantalum or niobium; or (b) the group of alloys and higher order of alloys comprising tantalum tungsten, niobium tungsten, niobium tantalum, molybdenum niobium, molybdenum tungsten, molybdenum tantalum, chromium molybdenum, chromium tungsten, and tantalum rhenium; or (c) the group of compounds and complex carbides and nitrides comprising tantalum nitride, niobium nitride, tungsten nitride, zirconium nitride, zirconium carbide, tantalum carbide and niobium carbide.

\* \* \* \* \*